(12) United States Patent
Lv et al.

(10) Patent No.: US 11,579,466 B2
(45) Date of Patent: Feb. 14, 2023

(54) METHOD, DEVICE, APPARATUS AND COMPUTER READABLE STORAGE MEDIUM OF SIMULATING VOLUMETRIC 3D DISPLAY

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Hongzhen Xue, Beijing (CN); Guixin Yan, Beijing (CN); Fuqiang Ma, Beijing (CN); Lili Chen, Beijing (CN); Hao Zhang, Beijing (CN); Zhanshan Ma, Beijing (CN); Shuo Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/288,722

(22) PCT Filed: Aug. 13, 2020

(86) PCT No.: PCT/CN2020/108914
§ 371 (c)(1),
(2) Date: Apr. 26, 2021

(87) PCT Pub. No.: WO2021/042960
PCT Pub. Date: Mar. 11, 2021

(65) Prior Publication Data
US 2021/0405389 A1    Dec. 30, 2021

(30) Foreign Application Priority Data
Sep. 4, 2019    (CN) .......................... 201910834041.3

(51) Int. Cl.
*G02B 30/54* (2020.01)
*H04N 13/393* (2018.01)
(Continued)

(52) U.S. Cl.
CPC ............. *G02B 30/54* (2020.01); *G02B 30/52* (2020.01); *G06T 17/20* (2013.01); *H04N 13/393* (2018.05)

(58) Field of Classification Search
CPC ...... G02B 30/52; G02B 30/54; H04N 13/393; G06T 17/20
See application file for complete search history.

(56) References Cited

U.S. PATENT DOCUMENTS 6,052,100 A    4/2000  Soltan et al.
2019/0251755 A1*  8/2019  Douglas ................ A61B 34/10

FOREIGN PATENT DOCUMENTS

CN    101022565 A    8/2007
CN    101042775 A *  9/2007
(Continued)

OTHER PUBLICATIONS

PCT/CN2020/108914 International Search Report.

*Primary Examiner* — Alexander Eisen
*Assistant Examiner* — Cory A Almeida
(74) *Attorney, Agent, or Firm* — IPro, PLLC

(57) ABSTRACT

A method of simulating volumetric 3D display, includes: acquiring a display variable of a virtual display screen in a volumetric 3D display simulation space, the virtual display screen comprising a plurality of stereo pixels, the display variable comprising a voxel parameter of the plurality of stereo pixels, and the voxel parameter comprising a size in a first direction of the plurality of stereo pixels, a size in a second direction of the plurality of stereo pixels, and a size in a third direction of the plurality of stereo pixels; deter-
(Continued)

mining a display state parameter of a first stereo pixel of the plurality of stereo pixels for an object to be displayed according to the display variable; and simulating display of the object to be displayed according to the display state parameter. A computer-readable storage medium and a volumetric 3D display simulation apparatus are further provided.

14 Claims, 6 Drawing Sheets

(51) Int. Cl.
    *G02B 30/52*     (2020.01)
    *G06T 17/20*     (2006.01)

(56)     References Cited

FOREIGN PATENT DOCUMENTS

| | | |
|---|---|---|
| CN | 101042775 A | 9/2007 |
| CN | 108921928 A | 11/2018 |
| CN | 110458959 A | 11/2019 |

\* cited by examiner

METHOD, DEVICE, APPARATUS AND COMPUTER READABLE STORAGE MEDIUM OF SIMULATING VOLUMETRIC 3D DISPLAY

This application is a US national phase of a PCT application under PCT/CN2020/108914, which is filed on Aug. 13, 2020 and claims the priority of the Chinese patent application No. 201910834041.3 entitled with "METHOD, DEVICE, APPARATUS AND COMPUTER READABLE STORAGE MEDIUM OF SIMULATING VOLUMETRIC 3D DISPLAY" and filed on Sep. 4, 2019, the content of which is incorporated herein by reference in entirety.

TECHNICAL FIELD

The present disclosure relates to the field of display technology, and in particular, to a method, a device, apparatus and computer readable storage medium of simulating volumetric three-dimensional display.

BACKGROUND

In the field of 3D display, the volumetric three-dimensional (3D) display technology is an important research direction. The principle of the volumetric 3D display technology is to rotate a three-dimensional (2D) display panel around a fixed axis so as to obtain a 3D display space by sweeping. Corresponding images are displayed at different positions in the 3D display space, and the effect of true 3D display is achieved due to the visual persistence effect of the human eye.

In order to evaluate the effect of volumetric 3D display in advance, so as to obtain manufacturing parameters of volumetric 3D display devices, a simulation environment may be built based on Open Graphics Library (OpenGL). The computer simulates a 3D model to be displayed in volumetric 3D, performs voxelization on the 3D model, and displays data with an ideal stereo pixel point at a stereo pixel position.

However, it is difficult to obtain a display effect close to reality through the simulation of ideal stereo pixel points, which makes the degree of simulation and the efficiency of debugging parameters of the volumetric 3D display poor.

SUMMARY

The present disclosure provides a method, a device, apparatus and computer-readable storage medium of simulating volumetric 3D display.

According to the first aspect of embodiments of the present disclosure, there is provided a method of stimulating volumetric 3D display, including:

Acquiring a display variable of a virtual display screen in a volumetric 3D display simulation space, the virtual display screen including a plurality of stereo pixels, the display variables including a voxel parameter of the plurality of stereo pixels, and the voxel parameter including a size in a first direction of the stereo pixels, a size in a second direction of the stereo pixels, and a size in a third direction of the stereo pixels;

determining a display state parameter of a first stereo pixel of the plurality of stereo pixels for an object to be displayed according to the display variable; and simulating display of the object to be displayed according to the display state parameter.

For example, the display variable further comprises a rotation parameter of the virtual display screen, a phase plane attribute parameter and a phase plane quantity parameter of a stereo frame displayed on the virtual display screen; the display state parameter include a predetermined brightness and a predetermined color;

determining the display state parameter of the first stereo pixel for the object to be displayed according to the display viable comprises:

acquiring structure data and display data of the object to be displayed;

determining a position parameter of an intersection between the object to be displayed and a phase plane according to the structure data and the phase plane attribute parameter;

determining a stereo pixel closest to the intersection among the plurality of stereo pixels according to the position parameter; and determining, according to the rotation parameter of the virtual display screen, the display data and the phase plane quantity parameter, a display state parameter of the stereo pixel closest to the intersection as the display state parameter of the first stereo pixel.

For example, determining the stereo pixel closest to the intersection among the plurality of stereo pixels according to the position parameter comprises determining an outer envelope area of the stereo pixel closest to the intersection according to the position parameter, wherein the outer envelope area is obtained by extending the size in the first direction of the voxel parameter, the size in the second direction of the voxel parameter and the size in the third direction of the voxel parameter toward outside of the stereo pixel according to a preset scale by taking a geometric center of the stereo pixel as a reference;

selecting a plurality of points from an overlapping area of the object to be displayed and each of the outer envelope areas;

determining a distance between the plurality of points and a geometric center of each stereo pixel; and determining a brightness and a color of each stereo pixel by weighted average according to the distance and the display data.

For example, determining the brightness and the color of each stereo pixel by weighted average comprises:

determining a distance between each of the plurality of points and the geometric center according to coordinates of the plurality of points and coordinates of the geometric center of the stereo pixel; and determining, by taking a reciprocal of the distance as a weight, the brightness and the color of each of the stereo pixels according to the display data.

For example, the display variable further comprises a ratio of a display time within a stereo frame to a stereo frame duration; and stimulating display of the object to be display according to the display viable and the display state parameter comprises:

determining a volume of the first stereo pixel in a stereo space occupied by the virtual display screen according to the phase plane quantity parameter, the ratio of the display time within the stereo frame to the stereo frame duration, a spacing between the stereo pixel and a rotation axis of the display space, and the voxel parameter.

For example, determining the volume of the first stereo pixel in the stereo space occupied by the virtual display screen comprises:

for each stereo pixel for displaying the object to be displayed, acquiring a central angle corresponding to the stereo pixel in the display space, and determining a first arc length parameter and a second arc length parameter on the first surface of the stereo pixel according to the central angle;

obtaining a first point set on a first arc and a second point set on a second arc by dividing the first arc and the second arc equally according to the size in the third direction of the stereo pixel, the first arc length parameter and the second arc length parameter; determining the first surface according to the first point set and the second point set; the first arc and the second arc are respectively close to and far from a rotation axis of the stereo space occupied by the virtual display screen, and the first surface is a first side surface of the stereo pixel perpendicular to an axis direction of the stereo space occupied by the virtual display screen;

determining a second surface of the stereo pixel according to the size in the second direction of the stereo pixel and the first surface, where the second surface is a second side surface of the stereo pixel perpendicular to the axis direction of the stereo space occupied by the virtual display screen; and determining a volume of the first stereo pixel according to the first surface, the second surface and the size in the first direction of the stereo pixel.

For example, the display variable further comprises a screen resolution of the virtual display screen and a distance between two adjacent stereo pixels in a same direction; and after determining the display state parameter of the first stereo pixel according to the display variable, and before simulating display of the object to be displayed according to the display variable and the display state parameter, the method further comprises: adjusting the screen resolution of the virtual display screen and the distance between the two adjacent stereo pixels in the same direction according to a 3D Cartesian template lattice, so as to homogenize the plurality of stereo pixels in the stereo space occupied by the virtual display screen.

According to another aspect of the present disclosure, a volumetric 3D display simulation device is provided, comprising:

an acquiring module, configured to acquire a display variable of a virtual display screen in a 3D display simulation space, wherein the virtual display screen comprises a plurality of stereo pixels, the display variable comprises a voxel parameter of the stereo pixels, and the voxel parameter comprises a size in a first direction of the stereo pixels, a size in a second direction of the stereo pixels, and a size in a third direction of the stereo pixels;

a determining module, configured to determine a display state parameter of a first stereo pixel among the plurality of stereo pixels for the object to be displayed according to the display variable; and a display module, configured to simulate display of the object to be displayed according to the display state parameter.

According to still another aspect of the present disclosure, a computer-readable storage medium storing a computer program is provided, wherein the computer program is executed by a computer, operations of the method of simulating volumetric 3D display according to the first aspect of the present disclosure.

According to yet another aspect of the present disclosure, a volumetric 3D display simulation apparatus is provided, comprising:

memory, configured to store operation instructions;

a processor, configured to execute the operation instructions so as to implement operations of the method of simulating volumetric 3D display according to the embodiments of the present disclosure.

In the method of stimulating volumetric 3D display according to the embodiments of the present disclosure, a stereo pixel with voxel parameter including the size in the first direction, the size in the second direction and the size in the third direction, is introduced and is used to display the object to be displayed, so as to stimulate the volumetric 3D display. Since the actual size of the stereo pixel, which is usually ignored, is also used as part of the simulation variable, it can effectively simulate a grainy phenomenon in the actual 3D display, making the simulation result more in line with the actual effect of the human eye viewing a 3D display device. Therefore, debugging parameter of the volumetric 3D display device may be obtained more accurately, thereby improving the efficiency of parameter debugging of the volumetric 3D display device.

BRIEF DESCRIPTION OF THE DRAWINGS

In order to more clearly describe the technical solutions according to the embodiments of the present disclosure, the following will briefly explain the drawings that need to be used in the description of the embodiments of the present disclosure.

DETAILED DESCRIPTION OF THE EMBODIMENTS

Figure 1:
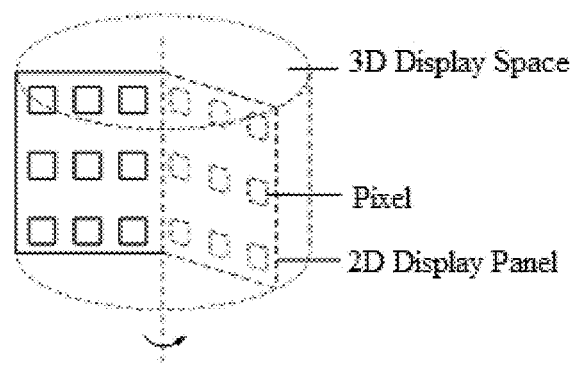
FIG. 1 is a schematic view illustrating the principle of a volumetric three-dimensional display device.

The embodiments of the present disclosure are described in detail below. Examples of the embodiments are illustrated in the accompanying drawings, throughout which the same or similar reference numerals designate the same or similar elements or elements with the same or similar functions. The embodiments described below with reference to the drawings are exemplary, and are only used to explain the present disclosure, and cannot be construed as a limit to the present disclosure.

One of ordinary skill in the art can understand that, unless specifically stated otherwise, the singular forms "a", "an", "said" and "the" used herein may further include plural forms. It should be further understood that the term "comprising" used in the specification of the present disclosure refers to presence of described features, integers, steps, operations, elements and/or components, but does not exclude presence or addition of one or more other features, integers, steps, operations, elements, components, and/or groups thereof. It should be understood that, in a case that an element is referred to as being "connected" or "coupled" to another element, it can be directly connected or coupled to the other element, or intervening elements may also be present. In addition, "connected" or "coupled" used herein may include wireless connection or wireless coupling. The term "and/or" as used herein includes all or any unit and all combinations of one or more associated listed items.

In order to make the objectives, technical solutions, and advantages of the present disclosure clearer, the embodiments of the present disclosure will be described in detail hereinafter with reference to the accompanying drawings.

First, the terms involved in the present disclosure will be explained.

OpenGL (Open Graphics Library) is a cross-language, cross-platform application programming interface (API) for rendering 2D and 3D vector graphics. This interface includes nearly 350 various function calls for drawing from simple graphics to complex 3D scenes. OpenGL is typically used in CAD, virtual reality, scientific visualization programs and video game development.

Stereo frame: FIG. 1 illustrates the principle of volumetric 3D display based on a swept manner through rotation. As illustrated in FIG. 1, the two-dimensional display panel includes a plurality of pixels. As the two-dimensional display panel rotates around one side edge, the two-dimensional display panel sweeps the 3D display space once to form a 3D frame.

Phase plane: The selected display position in a stereo frame. When the screen moves to each phase plane, an image is to be refreshed, and the image is referred to as an electronic frame.

Stereo pixel: a pixel in the stereo frame, also is referred to as a volumetric pixel, or voxel for short.

Figure 2:
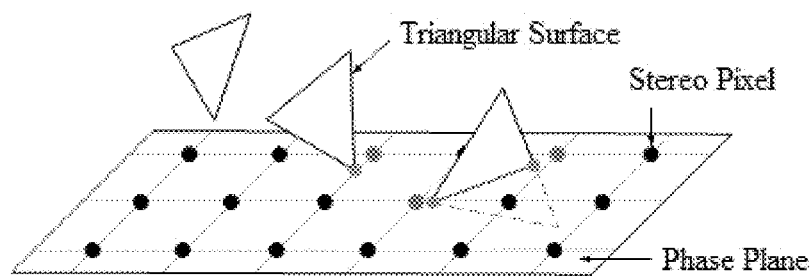
FIG. 2 is a schematic view illustrating a voxelization process of a method of stimulating volumetric 3D display.

In order to pre-evaluate the display effect of a volumetric 3D display device, a simulation environment is usually built based on OpenGL. After a 3D model to be displayed is voxelized, the data is displayed at the stereo pixel position according to ideal stereo pixels. The 3D model to be displayed is typically simulated with a triangular surface as a unit on a computer. As illustrated in FIG. 2, a triangle surface of the object to be displayed has three relationships with the ideal phase surface: disjointing, intersecting at a point, and intersecting in a line. A voxelization process of the object to be displayed is to traverse all the triangular surfaces of the object to be displayed, and obtain point data and line data (relatively small dots or connecting line between relatively small dots) that intersect with a current ideal phase surface, and map the data to regular voxel positions (larger dots) on the ideal phase surface to complete a voxelization process with respect to the current phase surface. In a case that all the ideal phase planes are traversed, the voxelization of the object to be displayed with respect to all the phase planes in a stereo frame is completed.

However, the voxel point in the above-mentioned volumetric 3D display simulation method is an ideal point, that is, it has no size and quality, and it is also instantly on or instantly off, which does not exist in practice. Therefore, the volumetric 3D display obtained by simulation with the ideal voxel points and the ideal phase surfaces is different from the display effect of actual products. Therefore, it is difficult to accurately guide parameter debugging and production of the 3D display device with this simulation method.

The technical solutions according to the embodiments of the present disclosure are described in detail below. The following specific embodiments may be combined with each other, and the same or similar concepts or processes may not be repeated in some embodiments. The embodiments of the present disclosure will be described hereinafter in conjunction with the accompanying drawings.

Figure 3:
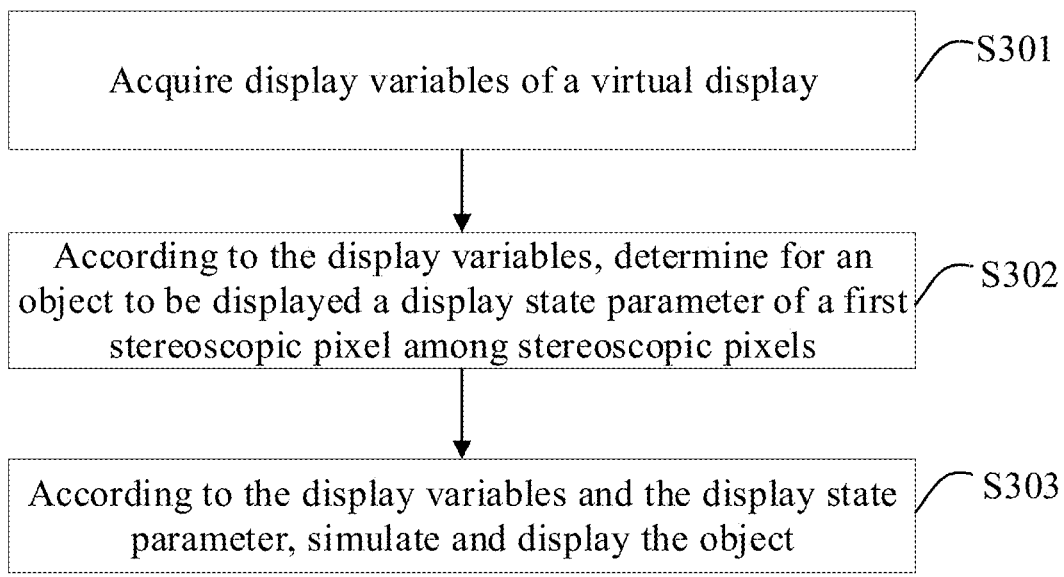
FIG. 3 is a schematic flowchart illustrating a method of stimulating volumetric 3D display according to an embodiment of the present disclosure.

Embodiments of the present disclosure provide a method of stimulating volumetric 3D display. As illustrated in FIG. 3, the method may include S301 to S303.

In S301, a display variable of a virtual display screen in a volumetric 3D display simulation space is obtained, the virtual display screen includes a plurality of stereo pixels, the display variable includes a voxel parameter of the plurality of stereo pixels, and the voxel parameter includes a size in a first direction of the stereo pixels, a size in a second direction of the stereo pixels and a size in a third direction of the stereo pixels.

In S302, a display state parameter of a first stereo pixel of the plurality of stereo pixels is determined for the object to be displayed according to the display variable.

In S303, display of the object to be displayed is simulated according to the display variable and the display state parameter.

In S301, the stereo pixels rendered on the virtual display screen in the computer simulation have sizes in three directions, including the size in the first direction, the size in the second direction, and the size in the third direction. For example, the sizes in the three directions may be a width of the stereo pixel, a height of the stereo pixel and a thickness of the stereo pixel, respectively.

If only a stereo pixel that has a volume and is approximate to the practice is obtained, the effect of volumetric 3D display cannot be obtained. The display effect may be evaluated only through the specific simulation of display of a 3D object to be displayed.

In an embodiment of the present disclosure, the display variable further includes a rotation parameter of the virtual display screen, a phase plane attribute parameter of the stereo frame and a phase plane quantity parameter of the stereoscopic frame. A stereo space occupied by the stereo frame is the same as a stereo space occupied by the virtual display screen. The display state parameter may include a predetermined brightness and a predetermined color.

In S302, the structure data and the display data of the object to be displayed are obtained. Then, according to the structural data of the object to be displayed and the phase surface attribute parameter of the display variable, a position parameter of the intersection between the object to be displayed and the phase surface is determined. The phase surface attribute parameter may include a position of a phase surface and content displayed on the phase surface.

A first stereo pixel among the plurality of stereo pixels that is closest to the intersection point may be determined according to the position parameter of the intersection between the object to be displayed and the phase plane.

Since the intersection between the object to be displayed and the phase plane is an arbitrary point on the phase plane, and the voxel is a fixed point on the phase plane, the two do not necessarily coincide. Therefore, the first stereo pixel closest to the intersection point may be used to approximately display the object to be displayed at the intersection.

According to the rotation parameter, the display data, and the phase plane quantity parameter of the virtual display screen, a display state parameter of the stereo pixel closest to the intersection is determined as a display state parameter of a stereo pixel corresponding to the object to be displayed. The rotation parameter of the virtual display screen, the display data, and the phase plane quantity parameter all affect simulation of display effect of the object to be displayed. The display state parameter is obtained according to the data mentioned above, so as to achieve real simulation of the object to be displayed.

In the method of stimulating volumetric 3D display according to the embodiments of the present disclosure, a stereo pixel with voxel parameter including the size in the first direction, the size in the second direction and the size in the third direction, is introduced and is used to display the object to be displayed, so as to stimulate the volumetric 3D display. Since the actual size of the stereo pixel, which is usually ignored, is also used as part of the simulation variable, it can effectively simulate a grainy phenomenon in the actual 3D display, making the simulation result more in line with the actual effect of the human eye viewing a 3D display device. Therefore, debugging parameter of the volumetric 3D display device can be obtained more accurately, thereby improving the efficiency of parameter debugging of the volumetric 3D display device.

Figure 4:
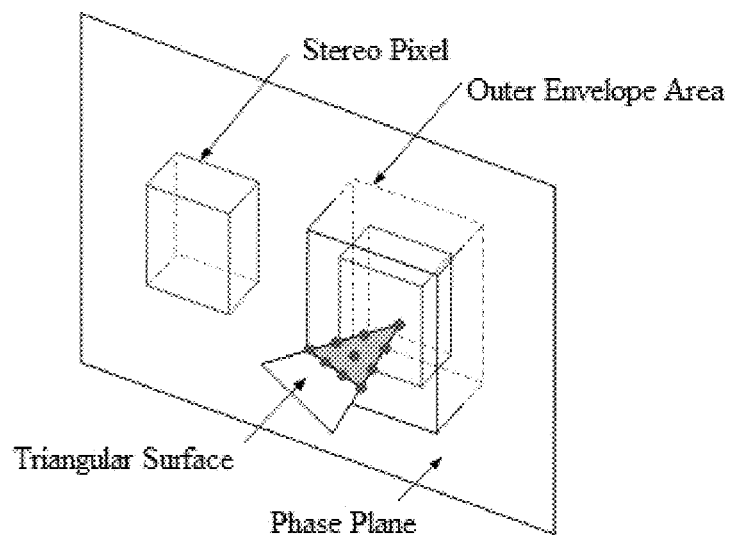
FIG. 4 is a schematic view illustrating a voxelization process of a volumetric 3D display method according to an embodiment of the disclosure.

An exemplary implementation is provided in the embodiments of the present disclosure. As illustrated in FIG. 4, determining the stereo pixel closest to the intersection according to the position parameter may include the following steps.

According to the position parameter, an outer envelope area of a first stereo pixel closest to the intersection is determined. The outer envelope area is obtained by extending the size in the first direction, the size in the second direction, and the size in the third direction of the voxel parameter outwards from the first stereo pixel according to a preset scale by taking a geometric center of the first stereo pixel as a reference.

Then a plurality of points in an overlapping area between the object to be displayed and each outer envelope area are selected. A distance parameter between the plurality of points and the geometric centers of respective stereo pixels is determined, and brightness and color of each stereo pixel are determined by weighted average according to the distance parameters and the display data.

Since the stereo pixel is required to emit light itself to display the object to be displayed, in practice, a certain area around the stereo pixel has a display function. However, these areas have different display levels and display effects with respect to the objects to be displayed. Therefore, by displaying the object to be displayed in a certain area outside the stereo pixel itself, that is, in the outer envelope area, a more realistic display effect can be obtained.

According to the distance parameter and the display data, the brightness and the color of each stereo pixel are determined by weighted average. For example, according to coordinates of the plurality of points and coordinates of the geometric center of the stereo pixel, a distance between each of the plurality of points and the geometric center is determined. Then, a reciprocal of the distance is taken as a weight, and the brightness and the color of each stereo pixel are determined according to the display data.

In the above process, with respect to determining the brightness and the color of each stereo pixel by weighted average in the process as mentioned above, an exemplary processing of the weighted average will be described by taking the color as an example.

A point set of n points are formed, wherein the n points are selected from an overlapping area of the object to be displayed and the outer envelope area $\{w_1, w_2, \ldots, w_n\}$. Coordinates of these n points are: $(x_i, y_i, z_i)$, $i=1, 2, \ldots, n$, wherein x, y, z are the coordinates of the three axes in the Cartesian coordinate system. The colors are as follows: $(R_i, G_i, B_i)$, $i=1, 2, \ldots, n$, R, G, and B are the three primary colors of red, green and blue respectively.

The coordinates of the center of the first stereo pixel are $(x_0, y_0, z_0)$, Thus, the distance between each point of the point set and the center of the stereo pixel $\{d_1, d_2, \ldots d_n\}$ may be determined by the following calculation formula:

$$d_i = \sqrt{(x_i - x0)^2 + (yi - y0)^2 + (zi - z0)^2}, i = 1, 2, \ldots, n.$$

The weight may be set according to the distance, and the color of the current real stereo pixel may be calculated by weighted average. For example, a reciprocal of the distance may be used as a weight, and the color of the current stereo pixel may be calculated by weighted average. The calculation formula is as follows:

$$\begin{cases} R = \sum_{i=1}^{n} \frac{1}{d_i} R_i \bigg/ \sum_{i=1}^{n} \frac{1}{d_i} \\ G = \sum_{i=1}^{n} \frac{1}{d_i} G_i \bigg/ \sum_{i=1}^{n} \frac{1}{d_i} \\ B = \sum_{i=1}^{n} \frac{1}{d_i} B_i \bigg/ \sum_{i=1}^{n} \frac{1}{d_i} \end{cases}$$

Figure 5:
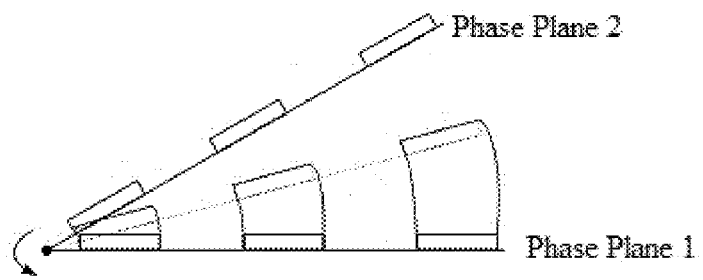
FIG. 5 is a schematic view illustrating a display state of a stereo pixel according to an embodiment of the disclosure.
Figure 6:
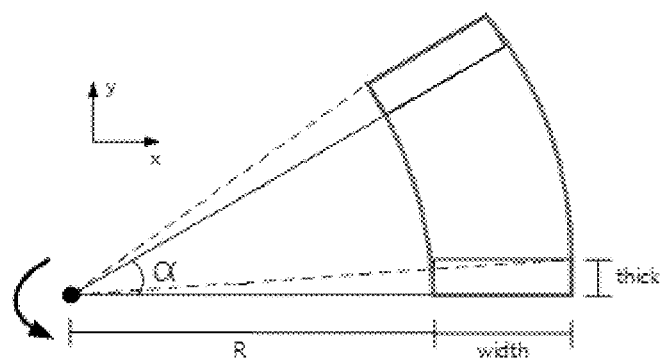
FIG. 6 is a schematic view of rendering a structure of a stereo pixel according to an embodiment of the disclosure.
Figure 7:
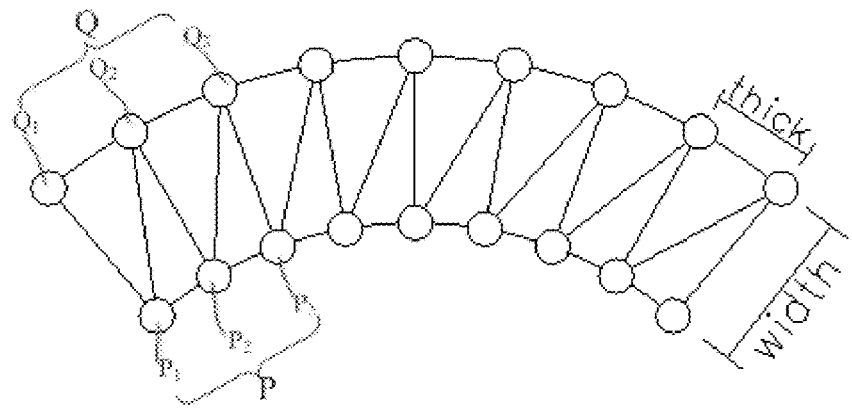
FIG. 7 is a schematic view of rendering a first surface of a stereo pixel according to an embodiment of the disclosure.

An exemplary implementation is provided according to an embodiment of the present disclosure. As illustrated in FIG. 5, the display variable further includes a ratio of a display time within the stereo frame to the stereo frame duration. In actual display devices, because the object to be displayed are usually dynamic images, the stereo pixel displays according to a certain display timing, and turning on or turning off of the stereo pixel is not completed instantly, it takes certain time from the off state to the fully on state. Similarly, it takes certain time from the fully on state to the off state. In the movement of the stereo pixel, for example, the virtual display screen rotates counterclockwise from a position of the phase plane 1 to a position of the phase plane 2, causing a visual drag phenomenon occur to the stereo pixel. Introduction of the ratio of the display time within the stereo frame to the stereo frame duration may make the display effect of the volumetric 3D display more realistic.

Therefore, in the above S303, simulating display of the object to be displayed according to the display state parameter may include the following steps.

A volume of the stereo pixel for displaying the object to be displayed in the stereo space occupied by the virtual display screen may be determined according to the phase plane quantity parameter, the ratio of the display time within the stereo frame to the stereo frame duration, a distance between the stereo pixel and a rotating axis of the display space, and the voxel parameter.

By introducing the display variable, the ratio of the display time within the stereo frame to the stereo frame duration, the shape and the size of the stereo pixel in the on state can be better simulated, so that display of the object to be displayed can be simulated more realistically, and accurate data may be provided for parameter debugging of the volumetric 3D display device.

In an exemplary embodiment, as illustrated in FIGS. 6 to 9, determining the corresponding stereo pixel for displaying the object to be displayed in the stereo space occupied by the virtual display screen may include the following steps.

For each stereo pixel for displaying the object to be displayed, a central angle α corresponding to the stereo pixel in the display space may be determined, and a parameter of a first arc length l1 and a parameter of second arc length l2 on a first surface of the stereo pixel may be determined according to the central angle α and the rotation radius R of the stereo pixel. An arrow illustrated in FIG. 6 indicates that the rotation direction of the virtual display screen is counterclockwise.

A first point set P={p1, p2, p3, . . . , pm} on the first arc l1 and a second point set Q={q1, q2, q3, . . . , qn} on the second arc l2 are obtained by dividing respectively the first arc l1 and the second arc l2 equally according to the size in the third direction of the stereo pixel, the parameter of the first arc length and the parameter of the second arc length, wherein both m and n are positive integers. According to the first point set and the second point set, a first surface of the stereo pixel is determined. Each point of the first point set and each point of the second point set are connected to each other to form a plurality of triangle surfaces, that is, the first surface of the stereo pixel may be drawn approximately. The first arc l1 and the second arc l2 are respectively close to and away from a rotation axis of the stereo space occupied by the virtual display screen, and the first surface is a first side surface of the stereo pixel perpendicular to the axial direction of the stereo space occupied by the virtual display screen.

Figure 8:
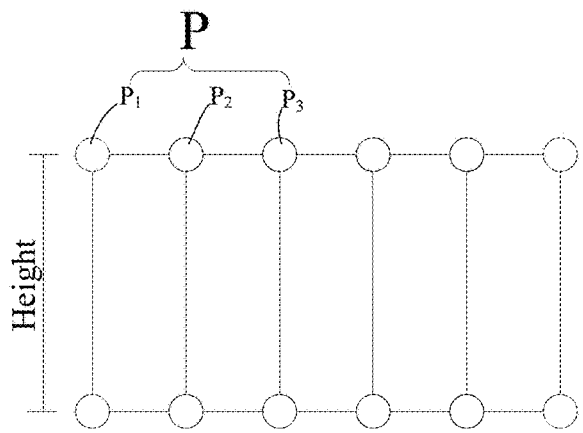
FIG. 8 is a schematic view of determining a volume of a stereo pixel according to an embodiment of the disclosure.
Figure 9:
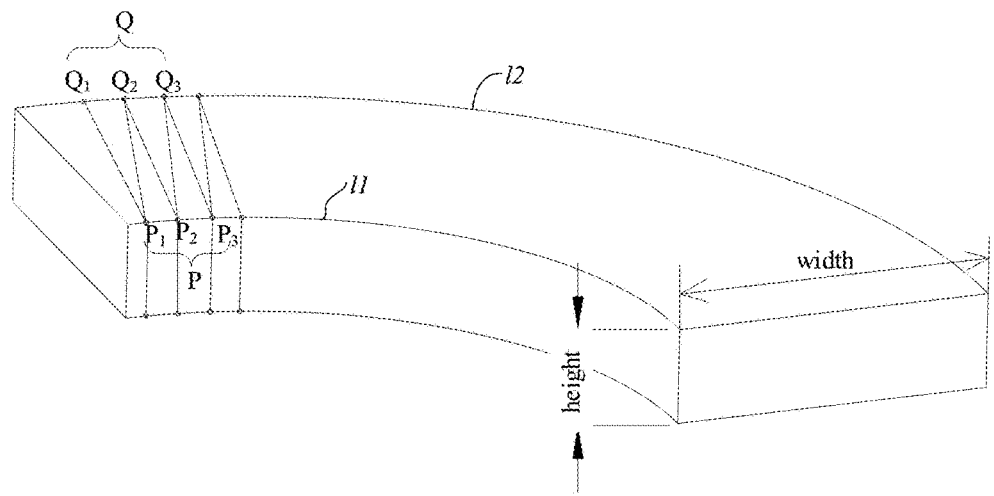
FIG. 9 is a schematic view of stereo drawing of a stereo pixel according to an embodiment of the disclosure.

A second surface of the stereo pixel is determined according to the size in the second direction of the stereo pixel height and the first surface of the stereo pixel. The second surface is a second side surface of the stereo pixel perpendicular to the axial direction of the stereo space occupied by the virtual display screen. Then, as illustrated in FIGS. 8 and 9, the volume of the stereo pixel for displaying is determined according to the first surface, the second surface and the size in the first direction of the stereo pixel width, that is, a real stereo pixel is drawn.

Through the above process, it is possible to render surface instead of rendering a solid body of a stereo pixel without affecting the viewing effect of simulation, which can achieve faster simulation and lower requirements on hardware devices in the computer system.

According to an embodiment of the present disclosure, the display variable may further include a screen resolution of the virtual display screen and a spacing between two adjacent stereo pixels. According to the display variables, after determining the display state parameter of the stereo pixel corresponding to the object to be displayed, and before simulating the display of the object to be displayed according to the display variable and the display state parameter, it further includes: adjusting the screen resolution of the virtual display screen and the spacing between the two adjacent stereo pixels in a same direction according to the 3D Cartesian template lattice, so as to homogenize the stereo pixels in the stereo space occupied by the virtual display screen.

Figure 10:
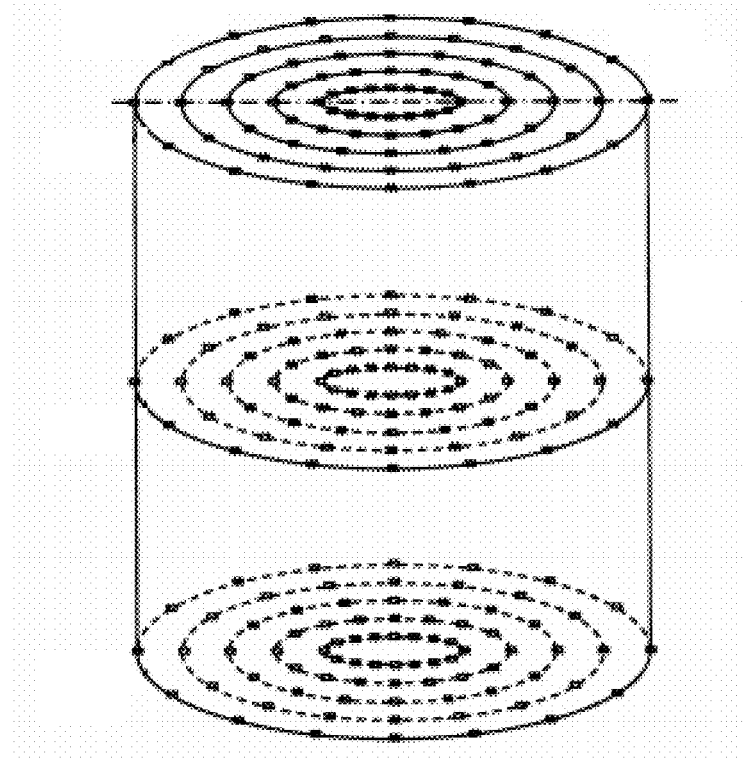
FIG. 10 is a schematic view illustrating overall distribution of stereo pixels of a volumetric 3D display device.

As illustrated in FIG. 10, an overall distribution of the stereo pixels with a characteristic of "dense inside and sparse outside" is determined by the way in which the stereo pixel of the rotating volumetric 3D display device is generated. If these stereo pixels are directly used for display, a central area is too bright and a margin area is too dark, resulting in poor overall viewing effect.

Figure 11:
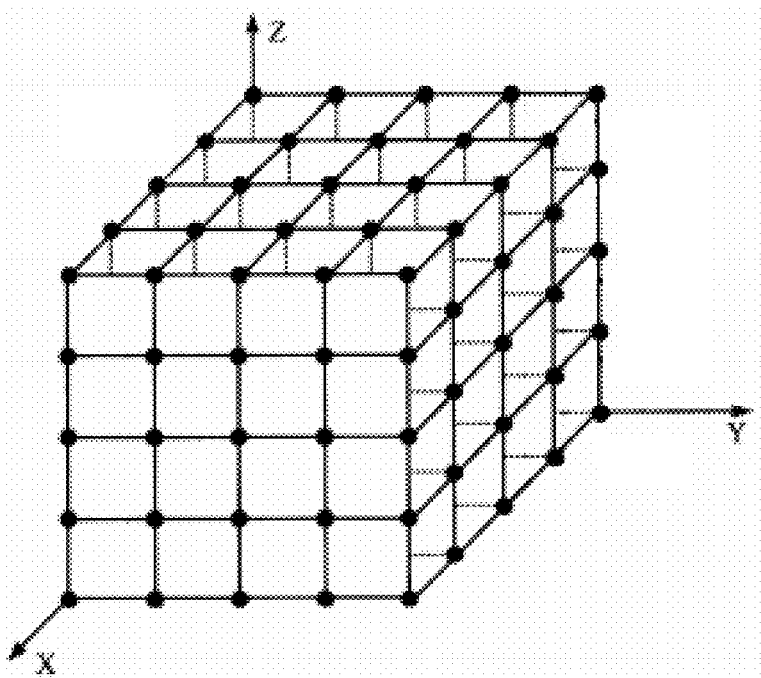
FIG. 11 is a schematic structural view illustrating a 3D Cartesian template lattice.

In order to mitigating this phenomenon, as illustrated in FIG. 11, homogenization process is performed to the distribution of stereo pixels with a 3D Cartesian template lattice. The 3D Cartesian template lattice is composed of a series of reference points. The homogenization process may include: for a certain stereo pixel, a reference point which is closest to the stereo pixel found from the 3D Cartesian template lattice, and a distance between the two is recorded as a position deviation, if the position deviation falls within an allowable range, the stereo pixel is retained, otherwise it is discarded.

Figure 12:
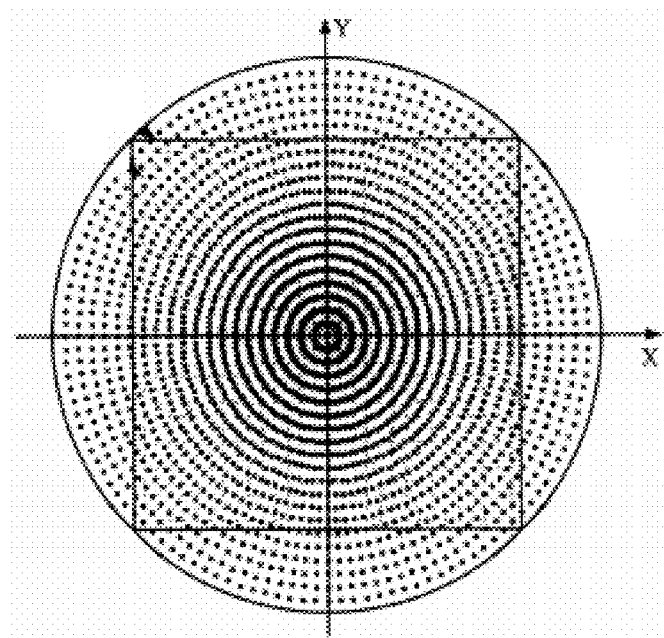
FIG. 12 is a schematic view illustrating stereo pixel distribution before homogenization of a volumetric 3D display device.
Figure 13:
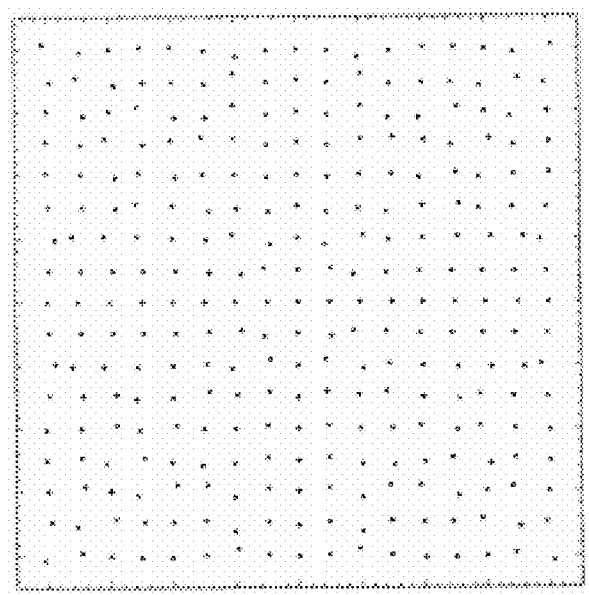
FIG. 13 is a schematic view illustrating stereo pixel distribution after homogenization of a volumetric 3D display device.

The top view before the homogenization is illustrated in FIG. 12, and the top view after the homogenization is illustrated in FIG. Using a 3D Cartesian template lattice to homogenize the distribution of stereo pixels can effectively mitigate the unevenness of the stereo pixel distribution.

Figure 14:
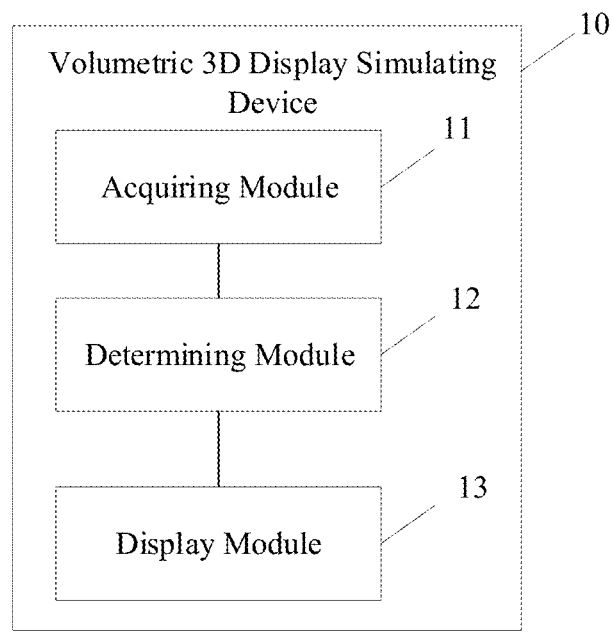
FIG. 14 is a schematic structural view illustrating a 3D display device according to an embodiment of the disclosure.

The present disclosure further provides a volumetric 3D display simulating device 10. As illustrated in FIG. 14, the device may include an acquiring module 11 configured to acquire a display variable of a virtual display screen in a volumetric 3D display simulation environment. The virtual display screen includes a plurality of stereo pixels. The display variable includes a voxel parameter of a virtual display screen, and the voxel parameter includes a size in a first direction of the plurality of stereo pixels, a size in a second direction of the plurality of stereo pixels and a size in a third direction of the plurality of stereo pixels. The device may further include a determining module 12 configured to determine a display state parameter of a stereo pixel corresponding to an object to be displayed according to the display variable; and a display module 13 configured to simulate display of the object to be displayed according to the display state parameter.

The determining module 11 determining the display state parameter of the stereo pixel corresponding to the object to be displayed according to the display variable includes: acquiring structure data and display data of the object to be displayed. A position parameter of an intersection between the object to be displayed and a phase plane is determined according to the structural data and a phase plane attribute parameter. A stereo pixel which is closest to the intersection is determined according to the position parameter. According to a rotation parameter of the virtual display screen, the display data, and a phase plane quantity parameter, a display state parameter of the stereo pixel closest to the intersection is determined as a display state parameter of a stereo pixel corresponding to the object to be displayed.

The determining module 11 determining the stereo pixel closest to the intersection according to the position parameter includes:

determining an outer envelope area of the stereo pixel closest to the intersection point according to the position parameter, wherein the outer envelope area is obtained by extending the size in the first direction of the stereo pixel, the size in the second direction of the stereo pixel, and the size in the third direction of the stereo pixel outwards from the stereo pixel according to a preset scale by taking a geometric center of the stereo pixel as a reference; and selecting a plurality of points on an overlapping area between the object to be displayed and each stereo pixel with an outer envelope area.

After that, a distance parameter between the plurality of points and the geometric center of each stereo pixel are determined, and brightness and a color of each stereo pixel are determined by weighted average according to the distance parameter and the display data.

The display module 13 is further configured to determine a volume of a stereo pixel for displaying the object to be displayed in a stereo space occupied by the virtual display screen according to the phase plane quantity parameter, a ratio of a display time within a stereo frame to a stereo frame duration, a spacing between the stereo pixel and a rotation axis of a display space, and the voxel parameter.

In addition, the determining module 12 is further configured to, for each stereo pixel corresponding to the object to be displayed, obtain a central angle corresponding to the stereo pixel in the display space, and to determine a parameter of a first arc and a parameter of a second arc on a first surface of the stereo pixel according to the central angle.

The display variable acquired by the acquiring module 11 further includes a screen resolution of the virtual display screen and a spacing between two adjacent stereo pixels in a same direction.

After determining the display state parameter of the stereo pixel corresponding to the object to be displayed according to the display variable and before simulating display of the object to be displayed according to the display variable and display state parameter, the determining module is further configured to adjust the screen resolution of the virtual display screen and the spacing between the adjacent two stereo pixels in the same direction so as to homogenize the stereo pixels in the stereo space occupied by the virtual display screen.

The volumetric 3D display stimulation device 10 according to the present disclosure takes the actual sizes of the stereo pixels, which are ignored in the conventional simulation algorithm, as a part of simulation variables, such that the simulation result is closer to the actual viewing effect that the actual volumetric 3D display devices provides and debugging parameters of the volumetric 3D display device can be obtained more accurately, thereby improving efficiency of debugging parameters of the volumetric 3D display device.

Embodiments of the present disclosure further provide a computer-readable storage medium with a computer program stored on the computer-readable storage medium, wherein in a case that the computer program is run on a computer, the computer is configured to implement operations of any one the methods as described in the above embodiments.

Embodiment of the present disclosure further provides a volumetric 3D display simulation device including a memory, a processor, and at least one program stored in the memory.

Figure 15:
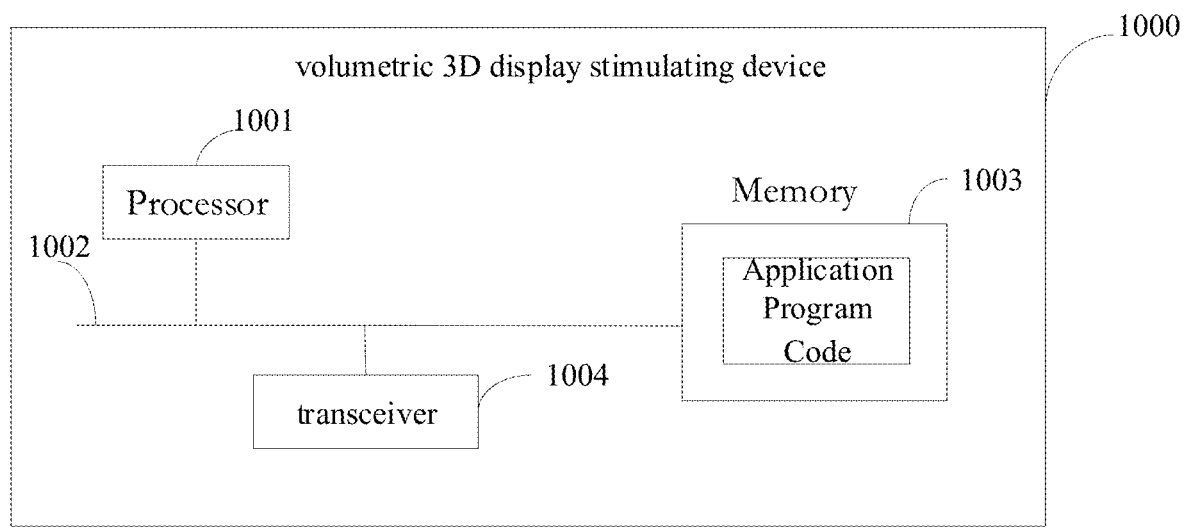
FIG. 15 is a schematic structural view illustrating a volumetric 3D display simulating device according to an embodiment of the disclosure.

In an optional embodiment of the present disclosure, a volumetric 3D display stimulation device is provided. As illustrated in FIG. 15, the volumetric 3D display stimulation device 1000 includes: a processor 1001 and a memory 1003. The processor 1001 and the memory 1003 are connected, for example, via a bus 1002. For example, the volumetric 3D display stimulation device 1000 may further include a transceiver 1004. It should be noted that in actual applications, the number of the transceiver 1004 is not limited to one, and the structure of the volumetric 3D display simulation device 1000 may not be construed as a limit to the embodiments of the present disclosure.

The processor 1001 may be a Central Processing Unit (CPU), a general-purpose processor, a Digital Signal Processor (DSP), an Application Specific Integrated Circuit (ASIC), and a Field Programmable Gate Array (FPGA), or other programmable logic devices, transistor logic devices, hardware components or any combination thereof. It can implement or execute various exemplary logical blocks, modules, and circuits described in conjunction with the present disclosure. The processor 1001 may further be a combination that implements computing functions, for example, a combination of one or more microprocessors, a combination of a DSP and a microprocessor, and so on.

The bus 1002 may include a path for transferring information between the above-mentioned components. The bus 1002 may be a Peripheral Component Interconnect (PCI) bus or an Extended Industry Standard Architecture (EISA) bus or the like. The bus 1002 can be divided into an address bus, a data bus, a control bus, and the like. For ease of description, only one bold line is illustrated in FIG. 15, however, it does not mean that there is only one bus or one type of bus.

The memory 1003 may be, but not limited to, Read Only Memory (ROM) or other types of static storage devices that can store static information and instructions, Random Access Memory (RAM) or other types of dynamic storage device that can store dynamic information and instructions, Electrically Erasable Programmable Read Only Memory (EEPROM), Compact Disc Read Only Memory (CD-ROM) or other optical disk storage, optical disk storage (including compressed Optical discs, laser discs, optical discs, digital universal discs, Blu-ray discs, etc.), magnetic disk storage media or other magnetic storage devices, or any other medium that may be used to carry or store desired program codes in the form of instructions or data structures and may be accessed by a computer.

The memory 1003 is configured to store application program codes for implementing operations of any one of the methods according to the present disclosure, which is controlled by the processor 1001. The processor 1001 is configured to execute the application program code stored in the memory 1003 to implement the operations of any one of the methods according to the foregoing embodiments.

It should be understood that although the various steps in the flowchart of the drawings are displayed in sequence as indicated by the arrows, these steps are not necessarily performed in sequence in the order indicated by the arrows. Unless explicitly stated herein, the execution of these steps is not strictly limited in order, and they can be executed in other orders. Moreover, at least part of the steps in the flowchart of the drawings may include multiple sub-steps or multiple stages. These sub-steps or stages are not necessarily executed at the same time, and may be executed at different times, and the order of execution is not in sequence necessarily, but may be performed alternately or alternately with at least a part of other steps or sub-steps or stages of other steps.

The above are only some of the embodiments of the present disclosure. It should be noted by one of ordinary skill of the art that, without departing from the principle of the present invention, improvements and modifications may be made to the present disclosure, and these improvements and modifications also fall within the protection scope of the present disclosure.

The invention claimed is:

1. A method of simulating volumetric 3D display, comprising:
   acquiring a display variable of a virtual display screen in a volumetric 3D display simulation space, the virtual display screen comprising a plurality of stereo pixels, the display variable comprising a voxel parameter of the plurality of stereo pixels, and the voxel parameter comprising a size in a first direction of the plurality of stereo pixels, a size in a second direction of the plurality of stereo pixels, and a size in a third direction of the plurality of stereo pixels;
   determining a display state parameter of a first stereo pixel of the plurality of stereo pixels for an object to be displayed according to the display variable; and
   simulating display of the object to be displayed according to the display state parameter,
   wherein the display variable further comprises a phase plane quantity parameter of a stereo frame displayed on the virtual display screen, and a ratio of a display time within a stereo frame to a stereo frame duration; and
   stimulating display of the object to be display according to the display state parameter comprises:
   determining a volume of the first stereo pixel in a stereo space occupied by the virtual display screen according to the phase plane quantity parameter, the ratio of the display time within the stereo frame to the stereo frame duration, a spacing between the stereo pixel and a rotation axis of the display space, and the voxel parameter, wherein determining the volume of the first stereo pixel in the stereo space occupied by the virtual display screen comprises:
      for each stereo pixel for displaying the object to be displayed, acquiring a central angle corresponding to the stereo pixel in the display space, and determining a parameter of a first arc and a parameter of a second arc on a first surface of the stereo pixel according to the central angle;
      obtaining a first point set from the first arc and a second point set from the second arc by dividing the first arc and the second arc equally according to the size in the third direction of the stereo pixel, the parameter of the first arc and the parameter of the second arc;
      determining the first surface according to the first point set and the second point set, wherein the first arc and the second arc are respectively close to and far from a rotation axis of the stereo space occupied by the virtual display screen, and the first surface is a first side surface of the stereo pixel perpendicular to an axis direction of the stereo space occupied by the virtual display screen;
      determining a second surface of the stereo pixel according to the size in the second direction of the stereo pixel and the first surface, wherein the second surface is a second side surface of the stereo pixel perpendicular to the axis direction of the stereo space occupied by the virtual display screen; and
      determining the volume of the first stereo pixel according to the first surface, the second surface and the size in the first direction of the stereo pixel.

2. The method according to claim 1, wherein the display variable further comprises a rotation parameter of the virtual display screen, and a phase plane attribute parameter of the stereo frame displayed on the virtual display screen; the display state parameter includes a predetermined brightness and a predetermined color;
   determining the display state parameter of the stereo pixel of the plurality of stereo pixels for the object to be displayed according to the display viable comprises:
   acquiring structure data and display data of the object to be displayed;
   determining a position parameter of an intersection between the object to be displayed and a phase plane according to the structure data and the phase plane attribute parameter;
   determining a stereo pixel closest to the intersection among the plurality of stereo pixels according to the position parameter; and
   determining, according to the rotation parameter of the virtual display screen, the display data and the phase plane quantity parameter, a display state parameter of the stereo pixel closest to the intersection as the display state parameter of the first stereo pixel.

3. The method according to claim 2, wherein determining the stereo pixel closest to the intersection among the plurality of stereo pixels according to the position parameter comprises:
   determining an outer envelope area of the stereo pixel closest to the intersection according to the position parameter, wherein the outer envelope area is obtained by extending the size in the first direction of the voxel parameter, the size in the second direction of the voxel parameter and the size in the third direction of the voxel parameter toward outside of the stereo pixel according to a preset scale by taking a geometric center of the stereo pixel as a reference;
   selecting a plurality of points from an overlapping area of the object to be displayed and the outer envelope area;
   determining a distance between the plurality of points and a geometric center of each stereo pixel; and
   determining a brightness and a color of the stereo pixel by weighted average according to the distance and the display data.

4. The method according to claim 3, wherein determining the brightness and the color of the stereo pixel by weighted average according to the distance and the display data comprises:
   determining a distance between each of the plurality of points and the geometric center according to coordinates of the plurality of points and coordinates of the geometric center of the stereo pixel; and
   determining, by taking a reciprocal of the distance as a weight, the brightness and the color of the stereo pixel according to the display data.

5. The method according to claim 2, wherein the display variable further comprises a screen resolution of the virtual display screen and a distance between two adjacent stereo pixels in a same direction; and
   after determining the display state parameter of the first stereo pixel according to the display variable, and before simulating display of the object to be displayed according to the display variable and the display state parameter, the method further comprises: adjust the screen resolution of the virtual display screen and the distance between the two adjacent stereo pixels in the same direction according to a 3D Cartesian template lattice, so as to homogenize the plurality of stereo pixels in the stereo space occupied by the virtual display screen.

6. A non-transitory computer-readable storage medium storing a computer program, wherein in a case that the computer program is executed by a computer, following operations are implemented:

acquiring a display variable of a virtual display screen in a volumetric 3D display simulation space, the virtual display screen comprising a plurality of stereo pixels, the display variable comprising a voxel parameter of the plurality of stereo pixels, and the voxel parameter comprising a size in a first direction of the plurality of stereo pixels, a size in a second direction of the plurality of stereo pixels, and a size in a third direction of the plurality of stereo pixels;

determining a display state parameter of a first stereo pixel of the plurality of stereo pixels for an object to be displayed according to the display variable; and simulating display of the object to be displayed according to the display state parameter, wherein the display variable further comprises a phase plane quantity parameter of a stereo frame displayed on the virtual display screen, and a ratio of a display time within a stereo frame to a stereo frame duration; and stimulating display of the object to be display according to the display state parameter comprises:

determining a volume of the first stereo pixel in a stereo space occupied by the virtual display screen according to the phase plane quantity parameter, the ratio of the display time within the stereo frame to the stereo frame duration, a spacing between the stereo pixel and a rotation axis of the display space, and the voxel parameter, wherein determining the volume of the first stereo pixel in the stereo space occupied by the virtual display screen comprises:

for each stereo pixel for displaying the object to be displayed, acquiring a central angle corresponding to the stereo pixel in the display space, and determining a parameter of a first arc and a parameter of a second arc on a first surface of the stereo pixel according to the central angle;

obtaining a first point set from the first arc and a second point set from the second arc by dividing the first arc and the second arc equally according to the size in the third direction of the stereo pixel, the parameter of the first arc and the parameter of the second arc;

determining the first surface according to the first point set and the second point set, wherein the first arc and the second arc are respectively close to and far from a rotation axis of the stereo space occupied by the virtual display screen, and the first surface is a first side surface of the stereo pixel perpendicular to an axis direction of the stereo space occupied by the virtual display screen;

determining a second surface of the stereo pixel according to the size in the second direction of the stereo pixel and the first surface, wherein the second surface is a second side surface of the stereo pixel perpendicular to the axis direction of the stereo space occupied by the virtual display screen; and determining the volume of the first stereo pixel according to the first surface, the second surface and the size in the first direction of the stereo pixel.

7. The non-transitory computer-readable storage medium according to claim 6, wherein the display variable further comprises a rotation parameter of the virtual display screen, and a phase plane attribute parameter of the stereo frame displayed on the virtual display screen; the display state parameter includes a predetermined brightness and a predetermined color;

determining the display state parameter of the stereo pixel of the plurality of stereo pixels for the object to be displayed according to the display viable comprises:

acquiring structure data and display data of the object to be displayed;

determining a position parameter of an intersection between the object to be displayed and a phase plane according to the structure data and the phase plane attribute parameter;

determining a stereo pixel closest to the intersection among the plurality of stereo pixels according to the position parameter; and determining, according to the rotation parameter of the virtual display screen, the display data and the phase plane quantity parameter, a display state parameter of the stereo pixel closest to the intersection as the display state parameter of the first stereo pixel.

8. The non-transitory computer-readable storage medium according to claim 7, wherein determining the stereo pixel closest to the intersection among the plurality of stereo pixels according to the position parameter comprises:

determining an outer envelope area of the stereo pixel closest to the intersection according to the position parameter, wherein the outer envelope area is obtained by extending the size in the first direction of the voxel parameter, the size in the second direction of the voxel parameter and the size in the third direction of the voxel parameter toward outside of the stereo pixel according to a preset scale by taking a geometric center of the stereo pixel as a reference;

selecting a plurality of points from an overlapping area of the object to be displayed and the outer envelope area;

determining a distance between the plurality of points and a geometric center of each stereo pixel; and determining a brightness and a color of the stereo pixel by weighted average according to the distance and the display data.

9. The non-transitory computer-readable storage medium according to claim 8, wherein determining the brightness and the color of the stereo pixel by weighted average according to the distance and the display data comprises:

determining a distance between each of the plurality of points and the geometric center according to coordinates of the plurality of points and coordinates of the geometric center of the stereo pixel; and determining, by taking a reciprocal of the distance as a weight, the brightness and the color of the stereo pixel according to the display data.

10. The non-transitory computer-readable storage medium according to claim 7, wherein the display variable further comprises a screen resolution of the virtual display screen and a distance between two adjacent stereo pixels in a same direction; and after determining the display state parameter of the first stereo pixel according to the display variable, and before simulating display of the object to be displayed according to the display variable and the display state parameter, the method further comprises: adjust the screen resolution of the virtual display screen and the distance between the two adjacent stereo pixels in the same direction according to a 3D Cartesian template lattice, so as to homogenize the plurality of stereo pixels in the stereo space occupied by the virtual display screen.

11. A volumetric 3D display simulation apparatus, comprising:

memory, configured to store operation instructions; and
a processor, configured to execute the operation instructions;

wherein in response to that the operation instructions is executed by the processor, the processor is configured to:

acquire a display variable of a virtual display screen in a volumetric 3D display simulation space, the virtual display screen comprising a plurality of stereo pixels, the display variable comprising a voxel parameter of the plurality of stereo pixels, and the voxel parameter comprising a size in a first direction of the plurality of stereo pixels, a size in a second direction of the plurality of stereo pixels, and a size in a third direction of the plurality of stereo pixels;

determine a display state parameter of a first stereo pixel of the plurality of stereo pixels for an object to be displayed according to the display variable; and simulate display of the object to be displayed according to the display state parameter, wherein the display variable further comprises a phase plane quantity parameter of a stereo frame displayed on the virtual display screen, and a ratio of a display time within a stereo frame to a stereo frame duration; and in a case that the processor is configured to stimulate display of the object to be display according to the display state parameter, the processor is configured to:

determine a volume of the first stereo pixel in a stereo space occupied by the virtual display screen according to the phase plane quantity parameter, the ratio of the display time within the stereo frame to the stereo frame duration, a spacing between the stereo pixel and a rotation axis of the display space, and the voxel parameter, wherein in a case that the processor is configured to determine the volume of the first stereo pixel in the stereo space occupied by the virtual display screen, the processor is configured to:

for each stereo pixel for displaying the object to be displayed, acquire a central angle corresponding to the stereo pixel in the display space, and determine a parameter of a first arc and a parameter of a second arc on a first surface of the stereo pixel according to the central angle;

obtain a first point set from the first arc and a second point set from the second arc by dividing the first arc and the second arc equally according to the size in the third direction of the stereo pixel, the parameter of the first arc and the parameter of the second arc;

determine the first surface according to the first point set and the second point set, wherein the first arc and the second arc are respectively close to and far from a rotation axis of the stereo space occupied by the virtual display screen, and the first surface is a first side surface of the stereo pixel perpendicular to an axis direction of the stereo space occupied by the virtual display screen;

determine a second surface of the stereo pixel according to the size in the second direction of the stereo pixel and the first surface, wherein the second surface is a second side surface of the stereo pixel perpendicular to the axis direction of the stereo space occupied by the virtual display screen; and determine the volume of the first stereo pixel according to the first surface, the second surface and the size in the first direction of the stereo pixel.

12. The volumetric 3D display simulation apparatus according to claim 11, wherein the display variable further comprises a rotation parameter of the virtual display screen, and a phase plane attribute parameter of the stereo frame displayed on the virtual display screen; the display state parameter includes a predetermined brightness and a predetermined color;

wherein, in a case that the processor is configured to determine the display state parameter of the stereo pixel of the plurality of stereo pixels for the object to be displayed according to the display viable, the processor is configured to:

acquire structure data and display data of the object to be displayed;

determine a position parameter of an intersection between the object to be displayed and a phase plane according to the structure data and the phase plane attribute parameter;

determine a stereo pixel closest to the intersection among the plurality of stereo pixels according to the position parameter; and determine, according to the rotation parameter of the virtual display screen, the display data and the phase plane quantity parameter, a display state parameter of the stereo pixel closest to the intersection as the display state parameter of the first stereo pixel.

13. The volumetric 3D display simulation apparatus according to claim 12, wherein in a case that the processor is configured to determine the stereo pixel closest to the intersection among the plurality of stereo pixels according to the position parameter, the processor is configured to:

determine an outer envelope area of the stereo pixel closest to the intersection according to the position parameter, wherein the outer envelope area is obtained by extending the size in the first direction of the voxel parameter, the size in the second direction of the voxel parameter and the size in the third direction of the voxel parameter toward outside of the stereo pixel according to a preset scale by taking a geometric center of the stereo pixel as a reference;

select a plurality of points from an overlapping area of the object to be displayed and the outer envelope area;

determine a distance between the plurality of points and a geometric center of each stereo pixel; and determine a brightness and a color of the stereo pixel by weighted average according to the distance and the display data.

14. The volumetric 3D display simulation apparatus according to claim 13, wherein in a case that the processor is configured to determine the brightness and the color of the stereo pixel by weighted average according to the distance and the display data, the processor is configured to:

determine a distance between each of the plurality of points and the geometric center according to coordinates of the plurality of points and coordinates of the geometric center of the stereo pixel; and determine, by taking a reciprocal of the distance as a weight, the brightness and the color of the stereo pixel according to the display data.

* * * * *